United States Patent [19]
Hwang

[11] Patent Number: 5,940,607
[45] Date of Patent: Aug. 17, 1999

[54] DEVICE AND METHOD FOR AUTOMATICALLY SELECTING A CENTRAL PROCESSING UNIT DRIVING FREQUENCY

[75] Inventor: Hae-Jin Hwang, Suwon, Rep. of Korea

[73] Assignee: SamSung Electronics Co., Ltd., Suwon, Rep. of Korea

[21] Appl. No.: 08/788,341

[22] Filed: Jan. 27, 1997

[30] Foreign Application Priority Data

Jan. 26, 1996 [KR] Rep. of Korea ................... 96 -1751

[51] Int. Cl.⁶ .................................................... G06F 1/08
[52] U.S. Cl. ............................................................ 395/556
[58] Field of Search ............................................. 395/556

[56] References Cited

U.S. PATENT DOCUMENTS

| | | |
|---|---|---|
| 5,136,180 | 8/1992 | Caviasca et al. ................... 307/269 |
| 5,361,368 | 11/1994 | Herzl et al. . |
| 5,361,375 | 11/1994 | Ogi . |
| 5,396,641 | 3/1995 | Iobst et al. . |
| 5,432,711 | 7/1995 | Jackson et al. . |
| 5,463,735 | 10/1995 | Pascucci et al. . |
| 5,475,846 | 12/1995 | Moore ................................. 395/733 |
| 5,576,945 | 11/1996 | McCline et al. . |
| 5,583,755 | 12/1996 | Ichikawa et al. . |

*Primary Examiner*—Thomas M. Heckler
*Attorney, Agent, or Firm*—Robert E. Bushnell, Esq.

[57] ABSTRACT

A device and method for automatically selecting a CPU (central processing unit) driving frequency may include one or more of frequency selecting apparatus that receives a control signal, and outputs a selection signal, clock supply apparatus that receives the selection signal from the frequency selecting apparatus and outputs an external supply frequency, a CPU that receives the external supply frequency from the clock supply apparatus and the selection signal from the frequency selecting apparatus, and operates by determining the internal operation frequency, and frequency selection controlling apparatus that receives an output signal from the CPU and outputs the signal controlling the frequency selecting apparatus. Since the present invention selects and supplies the appropriate frequency to the CPU after identifying an ID (identification) of the CPU, it has no trouble in selecting an appropriate frequency.

22 Claims, 4 Drawing Sheets

DEVICE AND METHOD FOR AUTOMATICALLY SELECTING A CENTRAL PROCESSING UNIT DRIVING FREQUENCY

CLAIM OF PRIORITY

This application makes reference to, incorporates the same herein, and claims all benefits accruing under 35 U.S.C. §119 from applications for A Device And Method For Automatically Selecting A CPU Driving Frequency earlier filed in the Korean Industrial Property Office on Jan. 26, 1996, and there duly assigned Ser. No. 96/1751.

FIELD OF INVENTION

The present invention relates to a device and method for operating a central processing unit. More particularly, the present invention relates to automatically selecting a central processing unit driving frequency.

DESCRIPTION OF THE PRIOR ART

Typically, an object of the computer development is to produce high-performance, low price computers. An example of improved computer performance is through the use of a Pentium central processing unit which generally has an internal operation frequency of 1.5, 2, 2.5, or 3 times the speed of an external supply frequency. Because various Pentium central processing units of various speeds can be used in mother boards, switches are used for selecting and supplying an appropriate frequency to the central processing unit. In a more specific example, the Pentium PS4c central processing unit has various external supply frequency upgrades of 50 MHz, 60 MHz, and 66 MHZ and various internal operation frequency upgrades of 1.5, 2, 2.5, and 3 times the speed of an external supply frequency. On this matter, among the exemplars of the contemporary practice are Ichikawa et al. (U.S. Pat. No. 5,583,755, Control System Having Independent And Cooperative Control Function, Dec. 10, 1996) discussing a control system using two controller modules. The controller module includes an independent controller, a cooperative controller, an adjuster and a synthesizer. McCline et al. (U.S. Pat. No. 5,576,945, Transaction Monitor Process With Pre-Arranged Modules For A Multiprocessor System, Nov. 19, 1996) discusses a multiple processor system that includes at least one processor pair each including a plurality of modules. The modules perform functions related to multiple independent threads, and are arranged in a predetermined order such that higher modules are dependent upon lower modules, and lower modules are independent from higher modules. Moore (U.S. Pat. No. 5,475,846, Apparatus Processing PCMCIA Interrupt Requests, Dec. 12, 1995) discusses an apparatus to permit sharing of interrupts between resident devices and removable PCMCIA peripherals overcome a deficiency in the PCMCIA standards. Pascucci et al. (U.S. Pat. No. 5,463,735, Method Of Downloading Information Stored In An Arching Device To Destination Network Controller Through Immediate Network Controllers In Accordance With Routing Information, Oct. 31, 1995) discusses a network system having a wide variety of applications that is particularly applicable to facilities management systems including network controllers which continuously process data related to building and industrial, environmental, security and other automated system controls. Jackson et al. (U.S. Pat. No. 5,432,711, Interface For Use With A Process Instrumentation System, Jul. 11, 1995) discusses an interface for a maintenance system used in conjunction with a process instrumentation system. More specifically, Jackson et al. discusses an interface used for maintaining and configuring smart devices. Iobst et al. (U.S. Pat. No. 5,396,641, Reconfigurable Memory Processor, Mar. 7, 1995) discusses a process in a memory chip designed to combine memory and computation on the same integrated circuit in order to make use of the bandwidth that results from the combination. Ogi (U.S. Pat. No. 5,361,375, Virtual Computer System Having Input/Output Interrupt Control Of Virtual Machines, Nov. 1, 1994) discusses a virtual computer system including a plurality of virtual machines running in a central processing unit with time shared, an input/output interrupt request, and a specific instruction generator for generating a specific instruction indicating a priority to one of the virtual machines which is running. Herzl et al. U.S. Pat. No. 5,361,368, Cross Interrogate Synchronization Mechanism Including Logic Means And Delay Register, Nov. 1, 1994) discusses a mechanism prioritizes cross interrogate requests between multiple requestors in a multi-processor system where the delay due to cable length interconnecting requesters results in requests not being received within one machine cycle. From my study of these exemplars of the contemporary practice and of the prior art, I believe that there is a need for an effective and improved frequency selection for a central processing unit as in the present invention.

SUMMARY OF THE INVENTION

Thus, it is an object of the present invention to provide an improved device and method for operating a central processing unit.

It is another object of the present invention to provide an improved device and process for automatically selecting a central processing unit driving frequency.

It is a further object of the present invention to provide an improved device and method for selecting and supplying an appropriate frequency to a central processing unit after identifying the central processing unit.

It is a further object of the present invention to provide a device and method for automatically selecting a central processing unit driving frequency, and selecting and supplying an appropriate frequency to a central processing unit after identifying the central processing unit.

To achieve one or more of the above objects, the present invention may include one or more of frequency selecting unit apparatus that receives a control signal, and transmits a selection signal, a clock supply unit that receives the selection signal from the frequency selecting unit and transmits an external supply frequency, a central processing unit that receives the external supply frequency from the clock supply unit and the selection signal from the frequency selection unit and operates after determining the internal operation frequency, and a frequency selection controlling unit that receives an output signal from the central processing unit and transmits the signal for controlling the frequency selecting unit.

To achieve these and other objects, the present invention may be practiced with a device and and a method that includes one or more of the steps that turn on the electrical power to a central processing unit at a basic frequency, that reads a representation of the an identification of the central processing unit and identifies the type of the central processing unit, and that transmits data through the central processing unit in order to supply a frequency corresponding to the type of the central processing unit.

BRIEF DESCRIPTION OF THE DRAWINGS

A more complete appreciation of the invention, and many of the attendant advantages thereto, will be readily apparent as the same becomes better understood by reference to the following detailed description when considered in connection with the accompanying drawings n which like reference symbols indicate the same or similar components, wherein.

DETAILED DESCRIPTION OF THE PREFERRED EMBODIMENTS

Figure 1:
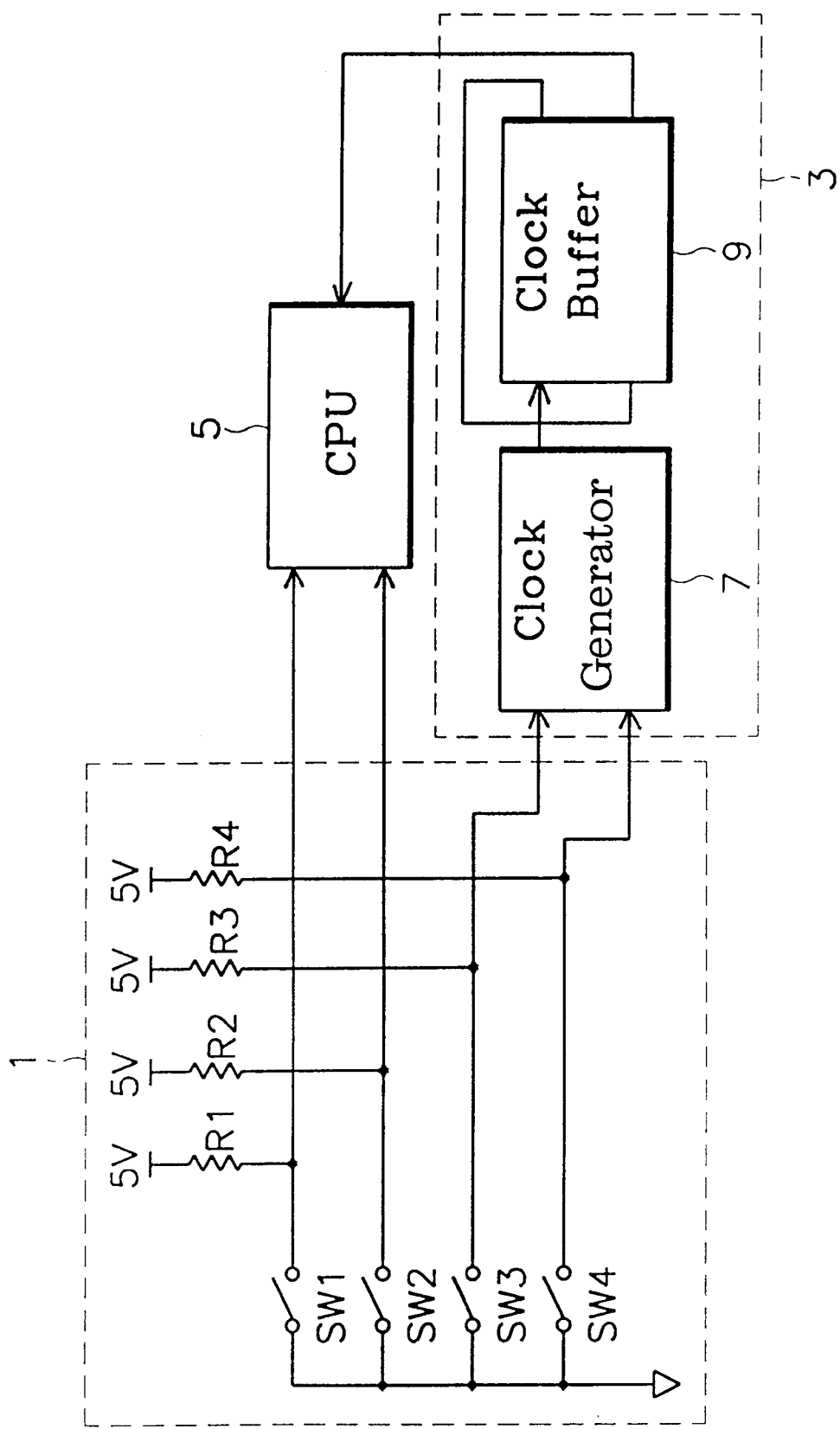
FIG. 1 is a circuit of a contemporary device that selects and supplies an appropriate frequency to a central processing unit.

As shown in FIG. 1, a contemporary device for selecting and supplying an appropriate frequency to a central processing unit may include one or more of frequency selecting stages 1 that transmits a selection signal, a clock supply unit 3 that receives a selection signal from the frequency selecting unit 1 and transmits an external supply frequency, and a central processing unit 5 that receives the external supply frequency from the clock supply unit 3 and a selection signal from the frequency selecting unit 1, and operates after determining an internal operation frequency.

The frequency selecting unit 1 may include a first, a second, a third, and a fourth switch with one terminal of each switch being grounded, a first resistor R1 with one terminal connected to the other terminal of the first switch and the other terminal connected to the supply voltage 5V, a second resistor R2 with one supply voltage 5V, a second resistor R2 with one terminal connected to the other terminal of the second switch and the other terminal connected to the supply voltage 5V, a third resistor R3 of which one terminal is connected to the other terminal of the third switch and the other terminal is connected to the supply voltage 5V. A fourth resistor R4 has one terminal connected to the other terminal of the fourth switch and the other terminal connected to the supply voltage 5V.

The clock supply unit 3 may include a clock generator 7 has a first input terminal connected to the other terminal of the third switch and a second input terminal connected to the other terminal of the fourth switch, and transmits the clock signal corresponding to the frequency value received from the frequency selecting unit 1, and a clock buffer 9 which receives the clock signal from the clock generator 7 through the first input terminal and transmits the clock signal to the first output terminal. The signal is fed back from the first output terminal through the second input terminal and transmits the signal to the second output terminal.

In the operation of the device for selecting and supplying an appropriate frequency to the central processing unit, the user sets the third and the fourth switch of the frequency selecting unit 1 in order to supply a selection signal to the clock generator 7 of the clock supply unit 3, and then the user sets the first and the second switch of the frequency selecting unit 1 in order to supply a selection signal to the central processing unit 5. The clock generator 7 of the clock supply unit 3 receives the selection signal and transmits a clock signal to the clock buffer 9 of the clock supply unit 3. The clock buffer 9 of the clock supply unit 3 receives the clock signal and transmits an external supply frequency to the central processing unit 5. At this time, the central processing unit 5 receives the external supply frequency from the clock buffer 9 and the selection signal from the first and second switch, and operates after determining the internal operation frequency.

The above example of a contemporary practice executes the manual process that selects an appropriate frequency to the central processing unit and set the switches in order to supply the appropriate external supply frequency and internal operation frequency. If, however, an inappropriate frequency is selected, the central processing unit can not operate normally and can be damaged.

Figure 2:
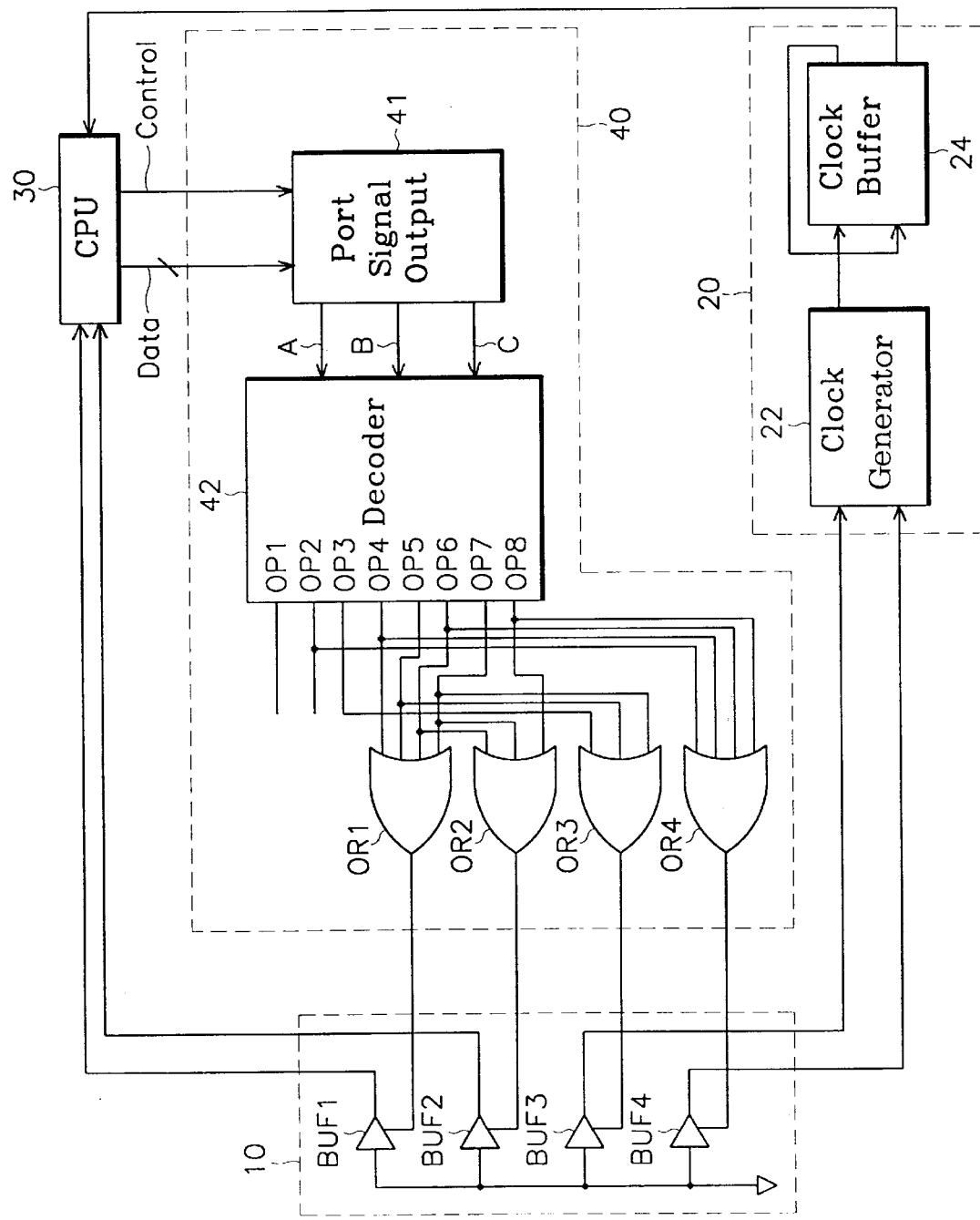
FIG. 2 is a block diagram of a device for automatically selecting a central processing unit driving frequency in accordance with the practice of a preferred embodiment of the present invention.

As shown in FIG. 2, a device for automatically selecting a central processing unit driving frequency in accordance with the preferred embodiment of the present invention may be constructed include one or more of frequency selecting unit 10 that receives a control signal, and transmits a selection signal; a clock supply unit 20 that receives the selection signal from the frequency selecting unit 10 and transmits an external supply frequency; a central processing unit 30 that receives the external supply frequency from the clock supply unit 20 and the selection signal from the frequency selecting unit 10, and operates after determining an internal operation frequency; and a frequency selection controlling unit 40 that receives the output signals from the central processing unit and transmits the signals for controlling the frequency selecting unit 10.

The frequency selecting unit 10 may include a first buffer (BUF1) with an input terminal grounded and a control input terminal connected to an output of the frequency selection controlling unit 40, that transmits a low signal when a high signal is applied to the control input terminal, a second buffer (BUF2) with an input terminal grounded and a control input terminal connected to an output of the frequency selection controlling unit 40, that transmits a low signal when a high signal is applied to the control input terminal, a third buffer (BUF3) with an input terminal is grounded and a control input terminal is connected to an output of the frequency selection controlling unit 40, that transmits a low signal when a high signal is inputted to the control input terminal, and a fourth buffer (BUF4) of which an input terminal is grounded and a control input terminal connected to an output of the frequency selection controlling unit 40, that transmits a low signal when a high signal is applied to the control input terminal.

The clock supply unit 20 may include a clock generator 22 having a first input terminal connected to an output terminal of the third buffer (BUF3) and a second input terminal connected to an output terminal of the fourth buffer (BUF3), that transmits a clock signal having a frequency corresponding to the received selection signal, and a clock buffer 24. In the clock buffer 24, a clock signal is inputted through a first input terminal connected to the output terminal of the clock generator 22. The clock signal is taken from the first output terminal, and a signal is applied through a second input terminal connected to the first output terminal. The signal is outputted through a second output terminal.

The frequency selection controlling unit 40 may include a port signal output apparatus 41, a decoder 42, and a first, a second, a third, and a fourth OR gate. The port signal output 41 receives data through a data line connected to the central processing unit 30, receives an address through a address line, receives a control signal through a control line, and transmits a port signal through port lines PortA, PortB, and PortC. The decoder 42 receives the terminal signal through port lines PortA, PortB and PortC connected to the port signal output 41, decodes the port signal, transmits a high signal through one signal line corresponding to the decoded value of the port signal, and transmits a low signal through the other signal lines. Each OR gate OR1, OR2, OR3 and OR4 transmits a logical sum of the signals received from the decoder 42.

Figure 3:
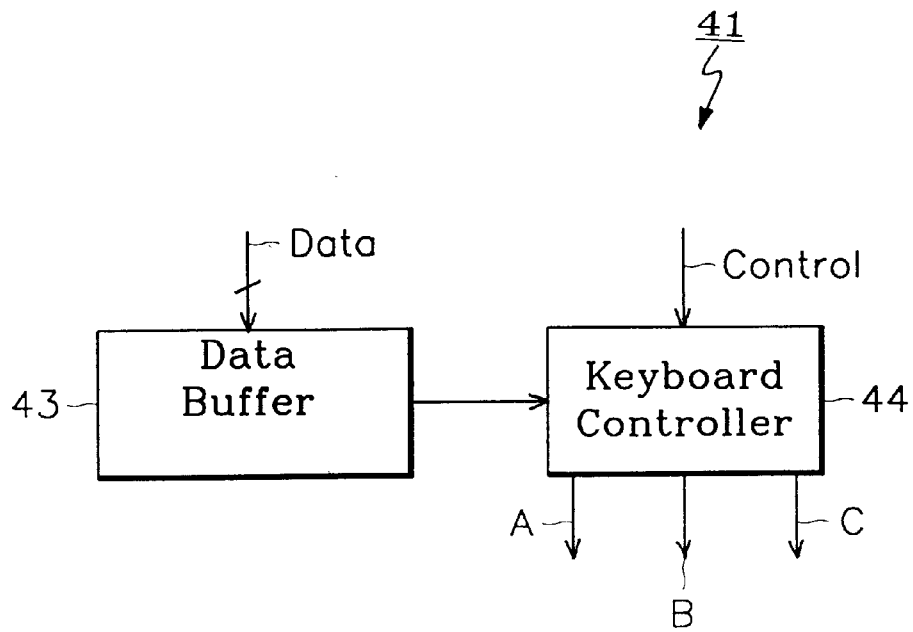
FIG. 3 is a circuit for a port signal output of the device for automatically selecting central processing unit driving frequency in accordance with another preferred embodiment of the present invention.

As shown in FIG. 3, the port signal output 41 of the device for automatically selecting a central processing unit driving frequency in accordance with the first preferred embodiment may include a data buffer 43 which receives data from the central processing unit 30 and transmits the data to the second terminal, and receives data from the second terminal and transmits the data through first terminal to the central processing unit 30, and a keyboard controller 44 which receives and transmits data through the second terminal of the data buffer 43, receives and transmits a control signal through the control line of the central processing unit 30, and transmits the signal determined according to the data and the control signal through the port lines PortA, PortB, and PortC.

Figure 4:
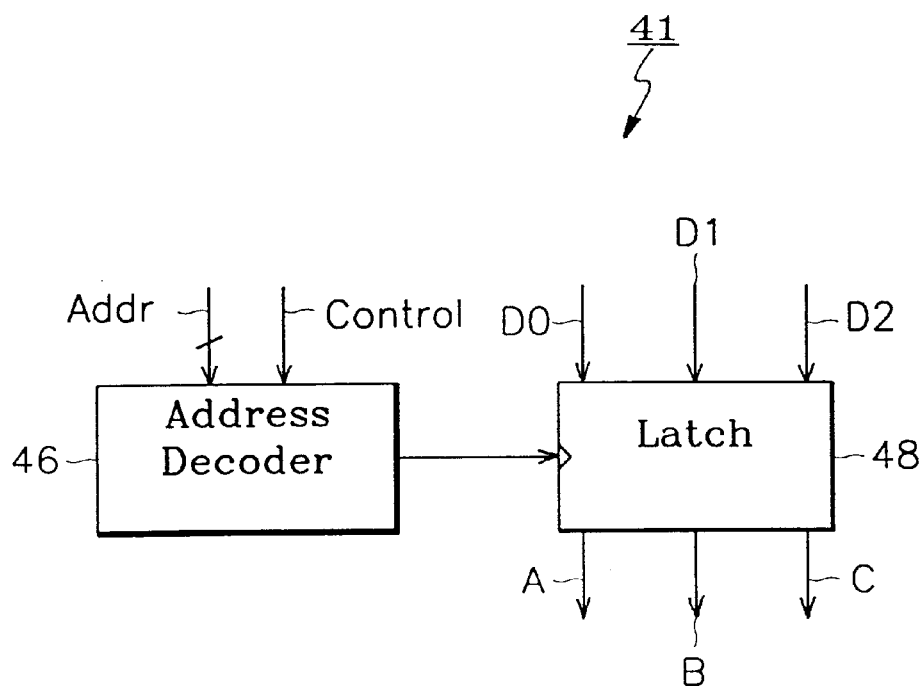
FIG. 4 is a circuit for a port signal output of the device for automatically selecting central processing unit driving frequency in accordance with yet another preferred embodiment of the present invention.

As shown in FIG. 4, the port signal output 41 of the device for automatically selecting a central processing unit driving frequency in accordance with the another preferred embodiment of the present invention may include an address decoder 46 that receives an address through an address line Addr connected to the central processing unit 30 and a control signal through a control line, and transmits a latch selecting signal LSEL if that address automatically selecting the central processing unit driving frequency, and a latch 48 which receives data D0, D1, and D2 through the data line connected to the central processing unit 30, receives the latching selecting signal LSEL from the address decoder 46, and transmits the data through the port lines PortA, PortB, and PortC after latching the data when the latch selecting signal LSEL changes from a "low" to a "high" state.

Figure 5:
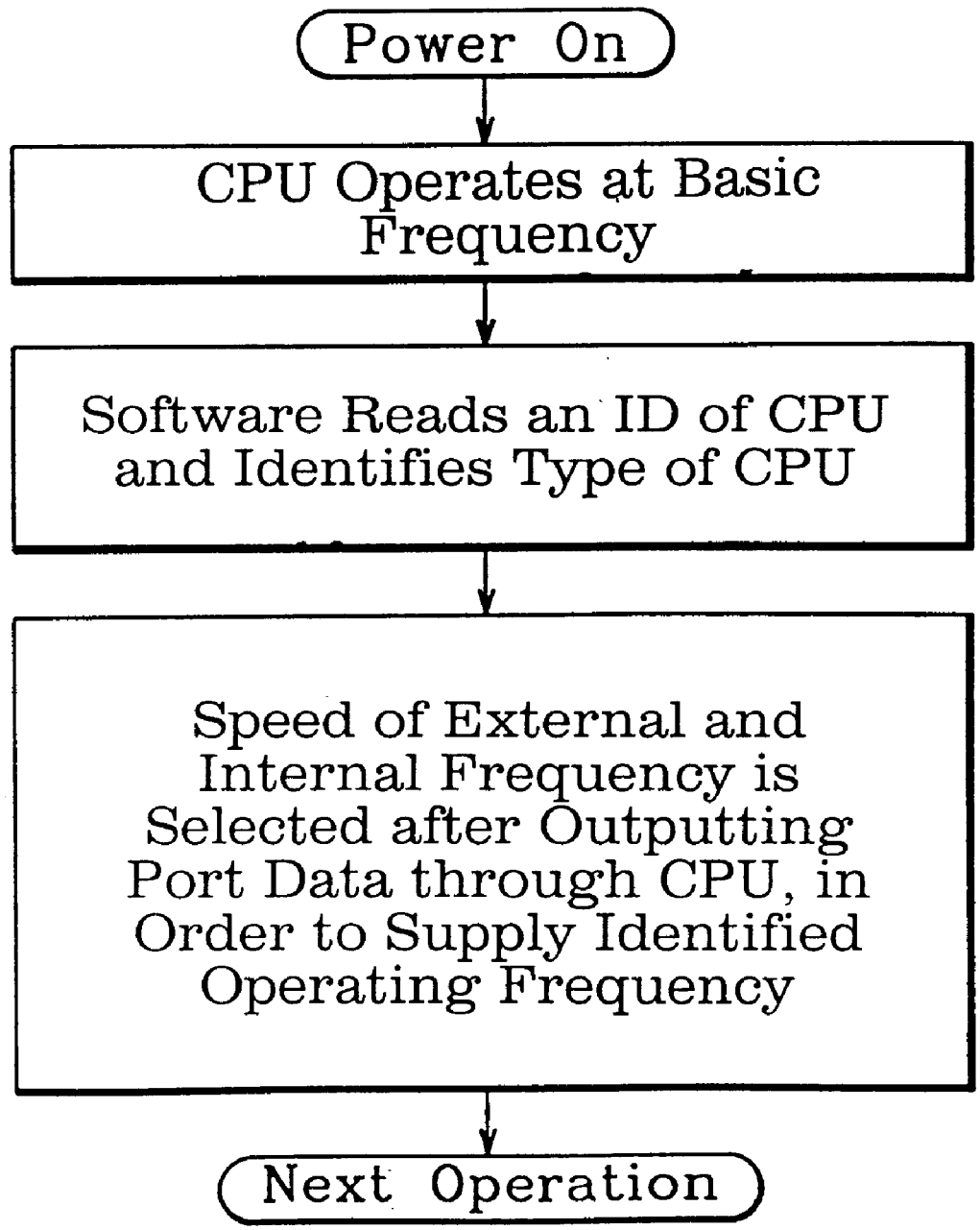
FIG. 5 is a flow chart for a controlling method for automatically selecting a central processing unit driving frequency in accordance with a preferred embodiment of the present invention.

As shown in FIG. 5, a controlling method for automatically selecting a central processing unit driving frequency in accordance with the preferred embodiment of the present invention may include the step that turns on the power and operates a central processing unit 30 at a basic frequency, the step that reads an ID of the central processing unit 30 using software and identifies the type of the central processing unit 30, and the step that the software transmits data through the central processing unit 30 in order to supply a frequency corresponding to the type of the central processing unit 30 and selects the multiples of the external supply frequency and the internal frequency.

The operation of a device and a method for automatically selecting a central processing unit driving frequency in accordance with the preferred embodiment of the present invention is as follows:

If power is supplied to the computer system, a low logic level signal is applied to a control input terminal of the buffers BUF1, BUF2, BUF3, and BUF4 of the frequency selecting unit 10; thus, the output of the buffers has a high logic level.

The clock generator 22 of the clock supply unit 20 receives the high signal from the third and the fourth buffer, and generates and transmits the clock signal at a frequency of 50 MHz according to Table 1.

TABLE 1

| The output of the third buffer | The output of the fourth buffer | The generating frequency |
|---|---|---|
| HIGH | HIGH | 50 MHz |
| HIGH | LOW | 60 MHZ |
| LOW | HIGH | 66.6 MHZ |

Clock buffer 24 receives the clock signal of 50 MHz from the clock generator 22 through the first output terminal. The clock signal is fed back to the second input terminal and the second output terminal conducts an external supply frequency of 50 MHz to central processing unit 30.

Central processing unit 30 receives the external supply frequency of 50 MHz from clock supply unit 20 and a high logic level signal from the first and the second buffers of frequency selecting unit 10. The internal frequency of central processing unit 30, according to Table 2, is 1.6 times the speed of the external supply frequency of 50 MHZ. Therefore, the internal operation operates at 75 MHZ (S1).

TABLE 2

| The output of the first buffer | The output of the second buffer | the Multiple of internal frequency |
|---|---|---|
| HIGH | HIGH | 1.5 |
| LOW | HIGH | 2 |
| LOW | HIGH | 2.5 |
| HIGH | LOW | 3 |

When central processing unit 30 operates in this manner, the computer system reads an ID of central processing unit 30 and identities the operating frequency corresponding to the ID by executing the POST (power on self test) (S2).

The following example uses the internal frequency as 133 MHZ, in order to easily explain the preferred embodiment of the present invention. The central processing unit 30 transmits the data setting the signal corresponding to the port lines PortA, PortB, and PortC in order to supply the operating frequency identified in the above step (S3).

Now, consider the output of the port signal in accordance with the first preferred embodiment of the present invention. The data buffer 43 of the frequency selecting controlling unit 40 receives and transmits the data of the above step. The keyboard controller 44 receives the data and transmits the port signal through the port lines PortA, PortB and PortC. See FIG. 3.

Next, consider the output of the port signal in accordance with the second preferred embodiment of the present invention. The central processing unit 30 transmits the address for automatically selecting a central processing unit driving frequency through the address line Addr and transmits the control signal through the control line. The address decoder 46 receives the address and control signals, and outputs the latch selecting signal LSEL of a high signal, if that address has a function of automatically selecting the driving frequency. Latch 48 receives the data D0, D1, and D2 through the data line connected to the central processing unit 30, and outputs the data as the terminal signal through port lines PortA, PortB and PortC when the latch selecting signal LSEL changes from a "low" to a "high" logic level. See FIG. 4.

According to the above first and second preferred embodiment, the high signal is outputted through the PortC, the low signal is outputted through the PortB, and the low signal is outputted through the PortA. The decoder 42 receives the signal from the port lines PortA, PortB and PortC of the keyboard controller 44, and outputs the signal through the output lines OP1–OP8 as shown in Table 3.

TABLE 3

| Terminal C | Terminal B | Terminal A | The signal lineoutputting a high signal |
|---|---|---|---|
| LOW | LOW | LOW | The first output line |
| LOW | LOW | HIGH | The second output line |
| LOW | HIGH | LOW | The third output line |
| LOW | HIGH | HIGH | The fourth output line |
| HGHG | LOW | LOW | The fifth output line |
| HIGH | LOW | HIGH | The six output line |
| HIGH | HIGH | LOW | The seventh output line |
| HIGH | HIGH | HIGH | The eighth output line |

The decoder 42 outputs a high signal through the fifth output line OP5 and a low signal through each of the output lines.

The first OR gate OR1 receives a signal from the fourth, the fifth, the sixth, and the seventh output line of the decoder 42, and outputs a logical sum of the these signals. The third OR gate OR3 receives a signal from the second, the fourth and the sixth output line of the decoder 42, and outputs the logical sum of the inputted signals. The fourth OR gate OR4 receives a signal from the first, third and fifth output line of the decoder apparatus 42, and outputs the logical sum of the inputted signals. Since the fifth output line OP5 of the decoder apparatus 42 outputs a high signal, the first OR gate OR1 and the third OR gate OR3 connected to the fifth output line output a high signal.

The first, the second, the third, and the fourth buffer of the frequency selecting unit 10 output a low signal to the output terminal when the output of the OR gates OR1–OR4 is high, and outputs a high signal to the output terminal when the output of the OR gates OR 10OR4 is at low level. Since the first and the third OR gate output a high signal, the first and the third buffer receive the output signal as a control signal output a low signal, and the second and the fourth buffer output a high signal.

The clock generator 22 of the clock supply unit 20 receives the signal from the third and the fourth buffer, and generates the clock signal corresponding the frequency determined by Table 1 and output the clock signal. Since the output of the third buffer is a low signal and the output of the fourth buffer is a high signal, the clock generator 22 generates the clock signal of 66.6 MHZ and outputs the clock signal.

The clock buffer apparatus 24 receives the clock signal from the clock generator 22 through the first input terminal, outputs the clock signal through the first input terminal. The second input terminal receives the clock signal from the first output terminal, and outputs the clock through the second output terminal. The clock buffer 24 receives the clock signal having a frequency of 66.6 MHZ from the clock generating apparatus 22, and outputs an external supply frequency of 66.6 MHZ. The central processing unit 30 receives the external supply frequency from the clock buffer 24, and receives the selection signal from the first and the second buffer of the frequency selecting unit 10. The central processing unit 30 operates the clock by multiplying the external supply frequency form the clock buffer 24 by the multiple of the internal frequency determined according to Table 2. The central processing unit 30 receives the external supply frequency of 66.6 MHZ from the clock buffer apparatus 24, and receives the low signal from the first buffer and high signal from the second buffer. The internal frequency, according to Table 2, is two times the speed of the external supply frequency. Therefore, the operating frequency is, two times 66.6 MHZ, or 133 MHZ.

In the preferred embodiment like as the above, the present invention provides the device and method for automatically selecting a central processing unit driving frequency after identifying an ID of the central processing unit.

What is claimed is:

1. A device for automatically selecting a frequency, comprising:

a central processing unit receiving an external supply frequency and a first selection signal, said central processing unit operating with an internal operation frequency governing an internal operation of said central processing unit, the internal operation frequency being determined in dependence upon said external supply frequency and the selection signal;

a clock supply receiving a second selection signal and generating said external supply frequency corresponding to the second selection signal;

a frequency selector having buffers transmitting the first selection signal and the second selection signal; and a frequency selection controller controlled by said central processing unit and controlling said frequency selector by automatically setting voltage levels at said buffers.

2. The device as claimed in claim 1, wherein said frequency selection controller comprises:

a port signaler connected to said central processing unit, said port signaler receiving information and instructions from said central processing unit and transmitting a port signal through port lines; and a decoder receiving the port signal through the port lines connected to said port signaler, decoding the port signal, and transmitting a decoded value signal.

3. The device as claimed in claim 2, wherein said port signaler comprises:

a data buffer having first and second terminals, receiving a first set of data through the first terminal connected to said central processing unit via a data line, transmitting the first set of data through a second terminal, receiving a second set of data through the second terminal, and transmitting the second set of data to said central processing unit; and a keyboard controller receiving and transmitting a third set of data through the second terminal of said data buffer, receiving and transmitting a control signal via a control line connected to said central processing unit, and transmitting the port signal, corresponding to the data and control signal, through the port lines.

4. The device as claimed in claim 2, wherein said port signaler comprises:

an address decoder receiving an address signal from an address line connected to said central processing unit, receiving a control signal from a control line connected to said central processing unit, and transmitting a latch selecting signal when the address signal corresponds to a command of automatically selecting said internal operating frequency of said central processing unit; and a latch receiving data from a data line connected to said central processing unit, receiving the latch selecting signal from said address decoder, and transmitting the data through the port lines after latching the data when the latch selecting signal changes from a "low" to a "high" state.

5. The device as claimed in claim 2, wherein said port signaler comprises:

an address decoder receiving an address signal from an address line connected to said central processing unit, receiving a control signal from a control line connected to said central processing unit, and transmitting a latch selecting signal when the address signal corresponds to a command of automatically selecting said internal operating frequency of said central processing unit; and a latch receiving data from a data line connected to said central processing unit, receiving the latch selecting signal from said address decoder, and transmitting the data through the port lines after latching the data when the latch selecting signal changes from a "high" to a "low" state.

6. The device as claimed in claim 1, wherein said frequency selector comprises:

a first buffer having a first input terminal connected to a constant voltage source, and a second input terminal connected to said frequency selection controller, for generating a first low signal when a first high signal is received at the second input terminal;

a second buffer having a third input terminal connected to the constant voltage source, and a fourth input terminal connected to said frequency selection controller, for generating a second low signal when a second high signal is received at the fourth input terminal;

a third buffer having a fifth input terminal connected to the constant voltage source, and a sixth input terminal connected to said frequency selection controller, for generating a third low signal when a third high signal is received at the sixth input terminal; and a fourth buffer having a seventh input terminal connected to a constant voltage source, and an eighth input terminal connected to said frequency selection controller, for generating a fourth low signal when a fourth high signal is received at the eighth input terminal.

7. The device as claimed in claim 6, wherein said clock supply comprises:

a clock generator having first and second generator input terminals and a generator output terminal, the first generator input terminal being connected to an output terminal of said third buffer and a second generator input terminal is connected to an output terminal of said fourth buffer, said clock generator receiving a frequency value from said third and fourth buffers and generating a clock signal corresponding to the frequency value; and a clock buffer having first and second buffer input terminals and first and second buffer output terminals, the first input terminal being connected to the generator output terminal of said clock generator and the clock signal from the generator output terminal, the first buffer output terminal transmitting the clock signal, and the second input buffer terminal receiving a buffer output signal from the first output terminal and transmitting the buffer output signal through the second output terminal.

8. The device as claimed in claim 1, wherein said frequency selection controller comprises:

a port signaler receiving data through a data line connected to said central processing unit, receiving addresses through an address line, and receiving control instructions through a control line connected to said central processing unit, and generating a port signal through port lines;

a decoder receiving the port signal through the port lines connected to said port signaler, decoding the port signal, transmitting a high signal corresponding to a decoded value through a first signal line, and transmitting a low signal through a second signal line; and first, second, third and fourth OR gates transmitting a decoded value signal received from said decoder.

9. The device as claimed in claim 8, wherein the decoded value signal is obtained after the device calculates by a logical summing method.

10. The device as claimed in claim 1, wherein said frequency selector comprises a plurality of buffers, each buffer of said plurality of buffers having a first input terminal connected to a constant voltage source, and second input terminal connected to said frequency selection controller, and each buffer generating a low signal when a high signal is received at the second input terminal.

11. The device as claimed in claim 1, wherein said frequency selector comprises a plurality of buffers, each having a first input terminal connected to a constant voltage source, and a second input terminal connected to said frequency selection controller, and each buffer generating a high signal when a low signal is received at the second input terminal.

12. The device as claimed in claim 1, wherein said frequency selector comprises a plurality of buffers, each buffer having a first input terminal connected to a constant voltage source, and a second input terminal connected to said frequency selection controller.

13. The device as claimed in claim 1, wherein said frequency selector comprises a plurality of buffers, each buffer connected to a constant voltage source, and to said frequency selection controller.

14. The device as claimed in claim 1, wherein said frequency selector comprises a plurality of buffers, each buffer connected to said frequency selection controller.

15. The device as claimed in claim 1, wherein said frequency selection controller comprises:

a port signaler receiving data through a data line connected to said central processing unit, receiving addresses through an address line, and receiving control instructions through a control line connected to said central processing unit, and transmitting a port signal through port lines;

a decoder receiving the port signal through the port lines connected to said port signaler, decoding the port signal, transmitting a high signal corresponding to a decoded value through a first signal line, and transmitting a low signal through a second signal line; and a plurality of OR gates transmitting a decoded value signal received from said decoder.

16. The device as claimed in claim 1, wherein said frequency selection controller comprises:

a port signaler receiving data through a data line connected to said central processing unit and receiving control instructions through a control line connected to said central processing unit, and transmitting a port signal through port lines;

a decoder receiving the port signal through the port lines connected to said port signaler, decoding the port signal, and transmitting a decoded value signal; and a plurality of OR gates connected to said decoder.

17. A device for automatically selecting a central processing unit driving frequency, comprising:

a frequency selecting unit coupled to receive frequency control signals, for transmitting frequency selection signals;

a clock supply unit coupled to receive first selected ones of the frequency selection signals, for transmitting a clock signal corresponding to an external supply frequency;

a central processing unit coupled to receive second selected ones of the frequency selection signals and the clock signal corresponding to said external supply frequency, for operating at an internal operation frequency after determining said internal operation frequency based on said second selected ones of the frequency selection signals and the clock signal; and a frequency selection controlling unit for responding to an output signal from said central processing unit to generate said frequency control signals for controlling the frequency selection of said frequency selecting unit.

18. The device as claimed in claim 17, wherein said frequency selection controlling unit comprises:

a port signaler coupled to receive data, addresses, and control instructions contained in said output signal from said central processing unit via a data line, an address line, and a control line respectively, for transmitting port signals through port lines;

a decoder coupled to receive the port signals through the port lines connected to said port signaler, for decoding the port signals to generate a plurality of decoded signals; and a plurality of OR gates disposed to logically combine different combinations of said decode signals, for generating said frequency control signals.

19. The device as claimed in claim 18, wherein said port signaler comprises a data buffer for receiving data contained in said output signal from said central processing unit, and a keyboard controller connected to said data buffer for receiving control instructions contained in said output signal from said central processing unit to produce said port signals via said port lines.

20. The circuit of claim 18, wherein said port signaler comprises an address decoder for receiving addresses and control instructions contained in said output signal from said central processing unit, and a latch connected to said address decoder for receiving data contained in said output signal from said central processing unit to produce said port signals via said port lines.

21. The device as claimed in claim 17, wherein said frequency selecting unit comprises a plurality of buffers, each buffer having a first input terminal connected to a constant voltage source, and a second input terminal coupled to receive a respective frequency control signal, for generating a respective frequency selection signal.

22. A method for selecting an operating frequency of a central processing unit in a computer system, comprising the steps of:

turning on power of the computer system and operating a central processing unit;

using a software program to identify a type of the central processing unit;

using the software program to generate a clock signal exhibiting an external frequency for driving the central processing unit after transmitting data through the central processing unit; and selecting and supplying an operating frequency based on a selected multiple of said external frequency corresponding to the type of the central processing unit identified.

\* \* \* \* \*